May 29, 1962 W. B. WILKINS 3,036,726
CRATE AND PARTITION STRUCTURE
Filed Nov. 15, 1957 3 Sheets-Sheet 1

INVENTOR.
WILLIAM BURDETTE
WILKINS
BY
ATTORNEYS

May 29, 1962 W. B. WILKINS 3,036,726
CRATE AND PARTITION STRUCTURE
Filed Nov. 15, 1957 3 Sheets-Sheet 2

INVENTOR.
WILLIAM BURDETTE WILKINS
BY
ATTORNEYS

INVENTOR.
WILLIAM BURDETTE WILKINS
BY
ATTORNEYS

United States Patent Office 3,036,726
Patented May 29, 1962

3,036,726
CRATE AND PARTITION STRUCTURE
William Burdette Wilkins, Roxboro, N.C., assignor to Reinforced Plastic Container Corporation, a corporation of North Carolina
Filed Nov. 15, 1957, Ser. No. 696,717
10 Claims. (Cl. 217—22)

This invention relates to separators for boxes, trays, crates and the like.

In the merchandising of bottled commodities, particularly soft drinks, for example, it is customary to distribute the bottled material in units known as "cases." The conventional "case" usually comprises a rectangular tray or flat having a bottom and vertically disposed sides, the interior of the tray being subdivided by intersecting partitions into a plurality of compartments, usually square, of a sized adapted to receive a single bottle. The partitions serve to separate adjacent bottles and prevent damage during transit. Such trays and partitions have customarily been made of wood or metal, and although attempts have been made to use paper board and plastic materials, such attempts have not been successful.

The present invention is concerned primarily with the fabrication of articles herein referred to as separators, sometimes reefrred to as partitions or nests, each said separator consisting of intersecting partitions made of fiber board, said intersecting partitions being bonded together at the points of intersection by plastic materials and fibrous reinforcing materials to form an integral compartmented separator which may be inserted in a tray, box, crate, or the like.

It is a further object of the invention to provide a separator structure which makes it possible to apply to the surfaces of the partitions the necessary heat and pressure required to cure the plastic materials and to bond the partitions together to form an integral separator.

Other objects and advantages of the invention will in part be obvious and in part appear hereinafter.

A preferred embodiment of the invention is shown in the accompanying drawings, in which FIGURE 1 is a plan view of a crate having partitions formed in accordance with the invention;

Figure 1:
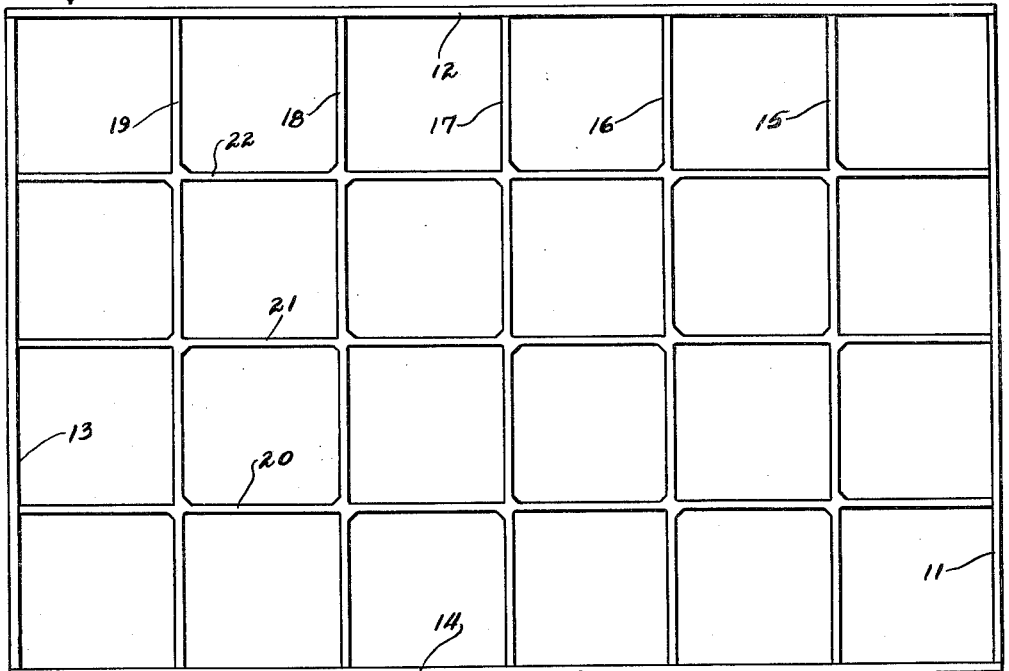

As shown in the drawings, the structure of the separator is such that its pattern of partitions viewed from the top side is a regular geometric one, in which the dimensions of each compartment duplicate those of each adjacent compartment, and the pattern of the partitions viewed from the bottom is such that, no two adjacent compartments are of the same dimension. When applied to a separator in which the compartments are to have a substantially square patatern, which is the conventional arrangement embodied in a soft drink tray, the compartments viewed from the upper side, therefore, will be square and of uniform dimensions, whereas the compartments viewed from the bottom will have squares of different dimensions with each row offset from the adjacent row so that squares of the same dimensions are not adjacent to each other.

In any molding operation it is essential that surfaces of elements which are to be joined, or to be shaped to any extent in the process, must be subjected to a substantial degree of heat and pressure to cause the plastic to flow and set so that the object may take its permanent form. Where the object is of a configuration comprising a plurality of intersecting elements having parallel surfaces such as the ordinary separator, it is apparent that although the elements can be subjected to pressure applied at their end edges, neither the joints nor the faces of the partitions can be subjected to any substantial degree of lateral pressure. It is also apparent that the die must be shaped so that the parts may be engaged or disengaged without distorting the material which is shaped between them.

Referring now to FIGURE 1, 10 represents a tray in which 11, 12, 13 and 14 are the outside walls. In this tray a separator comprises partitions 15, 16, 17, 18 and 19 arranged to divide the box into six sections and intersecting partitions 20, 21 and 22 to divide it vertically into four sections so that the box has 24 compartments. The arrangement is such that the compartments in the top view illustrated are of square configuration and all are uniform in dimensions. As typical dimensions for use in the manufacture of a tray for 6 ounce soft drink bottles, the compartments in this face of the separator will measure 2½ inches square.

Figure 2:
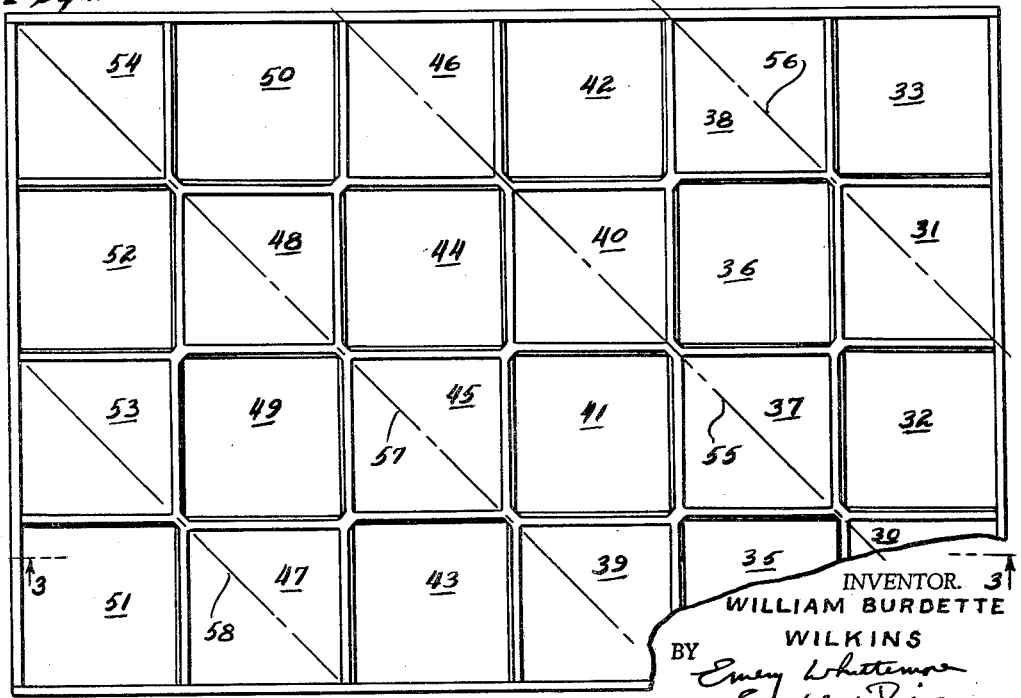
FIGURE 2 is a plan view of the bottom of the crate formed in accordance with the invention.

In FIGURE 2, the same tray viewed from the bottom side, the bottom of the tray having been removed, is shown. Therein it will be seen that compartments 30 and 31 in the bottom row are of the same dimensions and that the alternate ones 32 and 33 in the same row are also of identical dimensions, but larger than 30 and 31. In the next row spaces 35 and 36 are of the same size and are the larger ones whereas 37 and 38 are the smaller ones placed adjacent thereto. The arrangement of the two rows is such that the larger squares in the one row are adjacent to the smaller squares in the adjacent row so that the overall pattern thus developed, squares of the same dimension will have a common diagonal line which may be drawn through them. Thus, the squares 30 and 37, 40 and 46 are all of the smaller dimension and have the common diagonal line 55. In similar fashion squares along the adjacent diagonal are 31 and 38 and have the common diagonal 56. Squares 39, 45, 48, 54 have the common diagonal 57; and squares 47 and 53 have the common diagonal 58.

The pattern of openings developed at the bottom of the separators, therefore, is an alternate set of squares of the same dimensions, the squares being arranged so that they have a common diagonal. The remaining openings are fundamentally square, larger than the others, but have corners beveled by abutting on the common diagonal of the squares.

Figure 4:
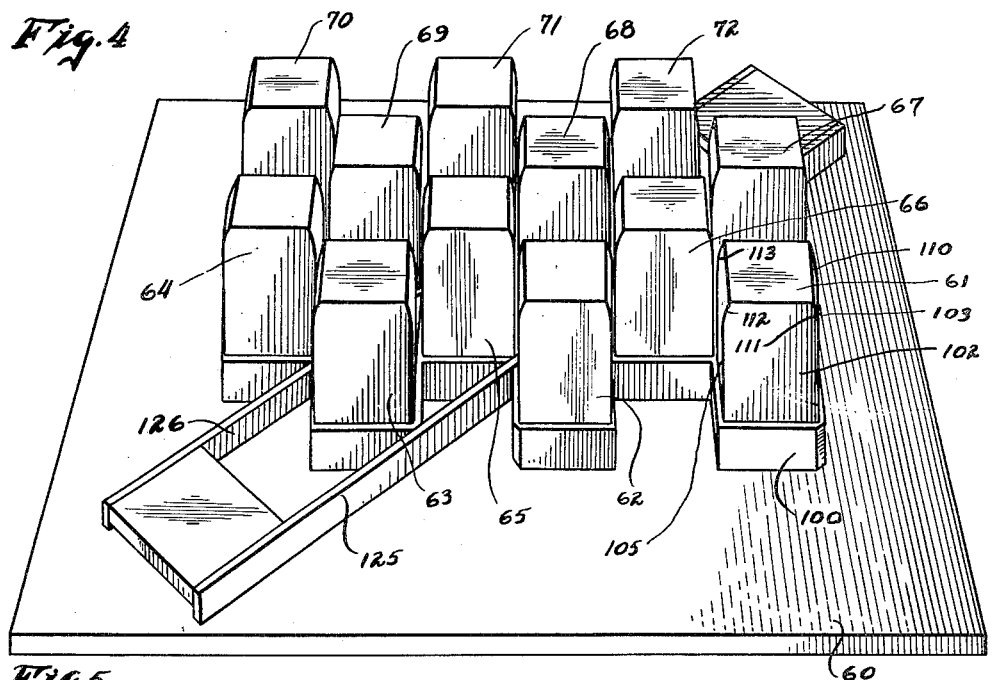
FIGURE 4 is a perspective view of half of the die used to form the crate.
Figure 5:
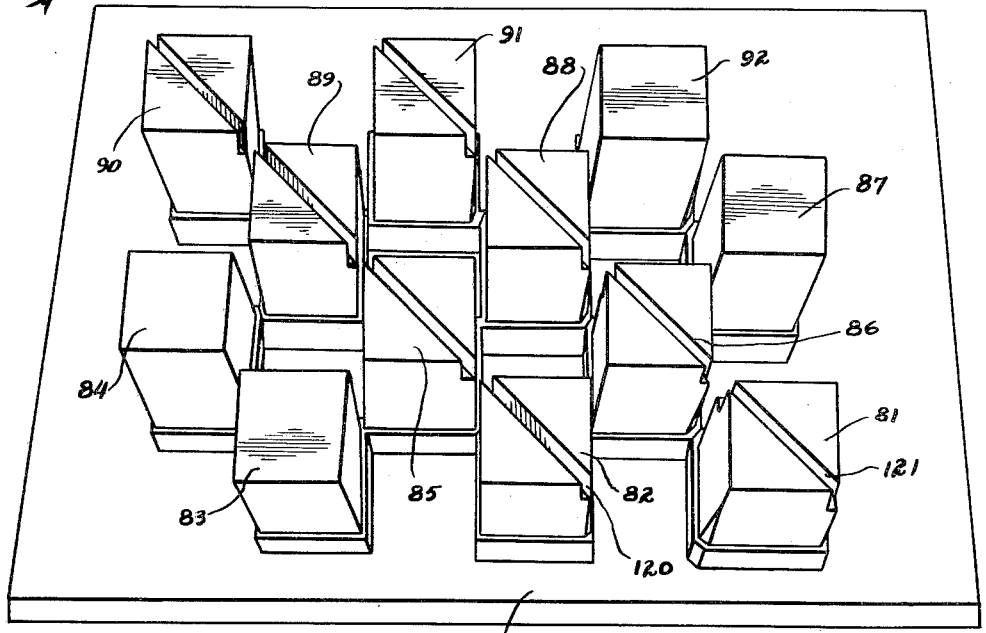
FIGURE 5 is a perspective view of the other half of the die.

In reference to the specific separator for the packaging of the 6 ounce soft drinks, the dimensions of the larger squares 32 and 33, etc., are 2⅝ inches by 2⅝ inches, whereas the smaller squares 30, 31, etc., are 2⅜ inches by 2⅜ inches. In this fashion a full complement of useful squares may be formed by the placement of the partitions, and the structure is such that it can be molded from a simply constructed die as is illustrated in FIGURES 4 and 5. The squares viewed as in FIGURE 1 are uniformly 2½ by 2½ inches.

Figure 3:
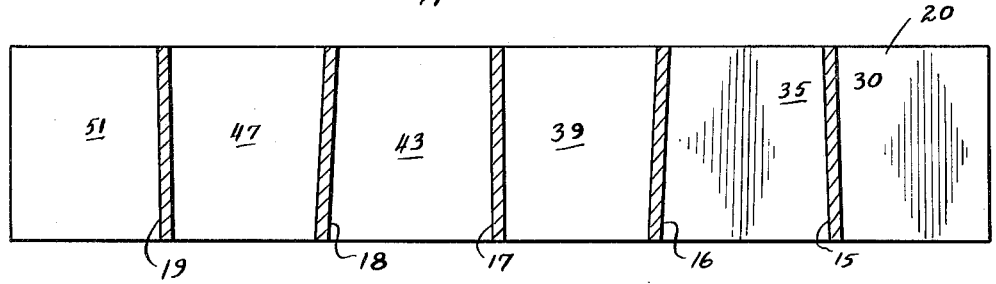
FIGURE 3 is a side view, in section, taken along line 3—3 of FIGURES 1 and 2.

In FIGURE 3 the compartments illustrate the arrangement of the sides. It can be seen that in the tray having a separator with partitions formed as described, the alternate compartments have a downwardly directed taper from the top to the bottom and upwardly directed taper in the remaining compartments extending from the bottom to the top. This makes it possible by application of vertical pressure to the die, as when the die parts are brought together, to apply lateral pressure to the partitions at the joints where adhesion and union of materials is desired.

Referring now to FIGURE 4, it will be seen that the die consists of a base 60 which carries thereon in plurality of prisms 61—72 representing 12 of the 24 forming a completed case; the remaining 12 prisms are part of the upper die shown in FIGURE 5 where 80 represents the base and 81—92 represent the remaining 12 prisms. The configuration of the prisms forming the bottom half of the die is shown in reference to the FIGURE 4 where 100 represents the base of a prism and 102, 103, 104 and 105 its several faces. In this instance, those faces are arranged so that the width of the prism at its base is 2⅝ inches, the width of opening desired in the finished separator and its width at the top 2½ inches. At the top of the prism the sides are tapered as shown at 110, 111, 112, 113 to permit distortion and compressions of the material with which to form the partitions in the structure.

Reference now to the upper half of the die will demonstrate that the prisms are formed on a base, with the faces tapering to a desired degree. To permit complete engagement of one-half of the die with the other, diagonals 120 and 121 are cut in two rows of prisms so that engagement with guides 125 and 126 in the lower half of the die may be made.

The resultant formation of the separator is such that partitions 15, 16, 17, 18, 19, 20, 21, 22 are formed and pre-cut with slots for fitting together the vertical and horizontal pattern of partitions.

Figure 6:
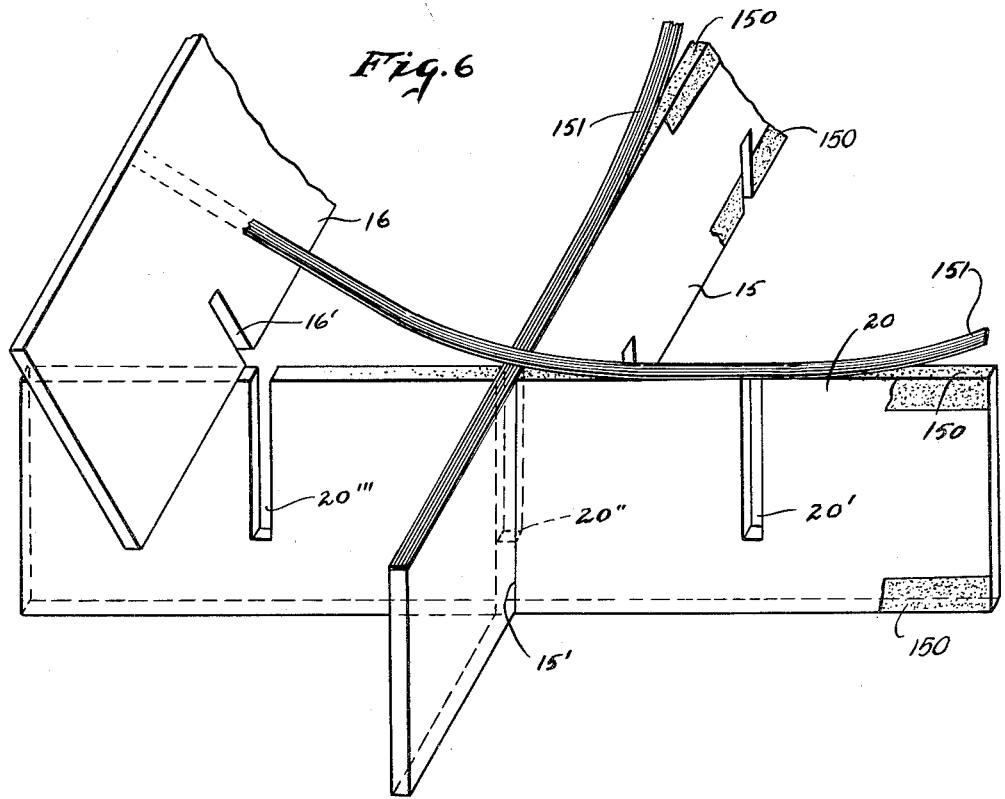
FIGURE 6 is a fragmentary diagram of a preliminary sub-assembly of the case.

For assembly purposes the partitions are loosely assembled as shown fragmentarily in FIGURE 6, and fitted over the lower half of the die, the orientation being such that the deeply slotted vertical partitions 20, 21, 22 have their continuous edges at the bottom face of the partitions. In FIGURE 6, partition 20, having slots 20′, 20″, 20‴ is shown with partitions 15 and 16 in engagement with it. Slots 15′ and 16′ are of lesser depth than mating slots in partition 20.

Having thus loosely assembled the separator, it is placed in the lower half of the die with a thermosetting resin 150 applied along the edges of the partitions at the top and the bottom to a depth of about ¼ inch, and glass fibers 151 laid along the top edges of the partitions. The mold formed of the two sections of the die is then closed tightly and with the exertion of pressure on the parts of the die, heat is applied to set the resin and thereby form the partitions of the separator as the unitary body. The dimensional taper of the prisms in the parts of the die produces substantial lateral pressure on the parts near the top and bottom edges of the partitions so that secure adhesion is obtained at these joints.

When the molding operation is completed, the sections are separated and the assembled partitions removed.

Any suitable paper board or fibre board may be used for forming the partitions, said board being preferably of substantial thickness, however, as for example, a thickness of about ⅛ inch. The resins which are applied thereto during the molding process form a hard, tough skin on the outside surfaces of the partitions which not only bonds the joints at the points of intersection but also strengthens and stiffens the partitions, making a strong wear resistant structure.

Though the glass fibres are preferred for forming the fibre reinforced top edges, other fibres having a high degree of tensile strength are suitable and for the purpose cotton, rayon, nylon, and the like, will do. Similar considerations apply to the identity of resinous material. Though polyester resins are preferred, epoxy and phenol formaldehyde types and other thermosetting resins of similar strength may be used.

As material for forming the partitions, any fiber board may be used, such as heavy cardboard impregnated with plastic, Masonite boards, and the like. The material from which the partitions are made may also be formed of thermoplastic resins. The only essential characteristic of the board need be that it be capable of undergoing at least the degree of deformation required by the tapered compartments.

What is claimed is:

1. A container having vertical jointed partitions therein dividing the container into a plurality of compartments, the partitions having top and bottom edges, defining top and bottom openings for compartments, the compartments being of square cross section but tapering in vertical directions from top to bottom, the partitions further being characterized by the fact that at the top edges they define compartments of uniform shape and dimensions and at the bottom edges alternate compartments are of uniform dimensions, said alternate ones being those having a common diagonal, said partitions being further characterized by plastic-impregnated fibres molded across joints between partitions.

2. A crate in accordance with claim 1 in which the said top openings are square.

3. A crate in accordance with claim 1 in which the said top openings are rectangular.

4. A crate in accordance with claim 2 in which the partitions are formed of fiber board.

5. A crate in accordance with claim 2 in which the partitions are formed of a plastic impregnated fiber board.

6. A partition structure suitable for use in a container to divide the container into a plurality of compartments, comprising a plurality of intersecting partitions arranged in fixed jointed relation to each other and forming joints at the points of intersection, edges of said intersecting partitions defining top and bottom openings, said compartments being of regular geometric form, regularly spaced, and being of generally rectilinear configuration, said joints being reinforced with strands of fibers extending along the edges of said intersecting partitions and crossing each other at the intersections of the partitions, and a layer of thermosetting resin extending along the edges of said intersecting partitions adhesively securing said strands of fibers to said edges.

7. A partition structure in accordance with claim 6 in which said strands consist of glass fibers.

8. A partition structure suitable for use in a container to divide the container into a plurality of compartments, said partition structure comprising a plurality of jointed partitions arranged in fixed relation to each other to define a plurality of compartments, top and bottom edges of said partitions thereby defining top and bottom openings of said compartments, said compartments being of regular geometric form regularly spaced, the top openings of said compartments being of uniform shape and dimensions, the bottom openings being arranged so that only those compartments having a common diagonal are of the same dimensions, edges defining openings between said partitions being reinforced across the joints formed at intersections thereof with plastic impregnated fiber.

9. A partition structure in accordance with claim 8 in which the partions are formed of fiber board.

10. A partition structure in accordance with claim 8 in which the partitions are formed of a plastic impregnated fiber board.

References Cited in the file of this patent

UNITED STATES PATENTS

| | | |
|---|---|---|
| 1,398,143 | Novotny | Nov. 22, 1921 |
| 1,995,482 | Plautz | Mar. 26, 1935 |
| 1,999,796 | Zinser | Apr. 30, 1935 |
| 2,087,209 | Lahey et al. | July 13, 1937 |
| 2,311,613 | Slayter | Feb. 16, 1943 |
| 2,399,804 | Hills et al. | May 7, 1946 |
| 2,414,171 | Scharff | Jan. 14, 1947 |
| 2,512,855 | Erickson | June 27, 1950 |
| 2,535,493 | Gerber | Dec. 26, 1950 |
| 2,743,030 | Read | Apr. 24, 1956 |
| 2,749,266 | Eldred | June 5, 1956 |
| 2,758,750 | Stroop | Aug. 14, 1956 |
| 2,842,279 | Gustafson | July 8, 1958 |